United States Patent [19]
Stallmo et al.

[11] Patent Number: 5,235,601
[45] Date of Patent: Aug. 10, 1993

[54] ON-LINE RESTORATION OF REDUNDANCY INFORMATION IN A REDUNDANT ARRAY SYSTEM

[75] Inventors: David C. Stallmo; William A. Brant; David Gordon, all of Boulder, Colo.

[73] Assignee: Array Technology Corporation, Boulder, Colo.

[21] Appl. No.: 632,182

[22] Filed: Dec. 21, 1990

[51] Int. Cl.⁵ .............................................. G06F 11/10
[52] U.S. Cl. .................................. 371/40.1; 371/10.1; 395/575
[58] Field of Search ..................... 371/10.1, 10.2, 13, 371/40.1; 395/575

[56] References Cited

U.S. PATENT DOCUMENTS

| | | | |
|---|---|---|---|
| 3,893,178 | 7/1975 | Sordello | 360/73 |
| 4,092,732 | 5/1978 | Ouchi | 364/900 |
| 4,467,421 | 8/1984 | White | 364/200 |
| 4,562,576 | 12/1985 | Ratcliffe | 371/11.4 |
| 4,667,326 | 5/1987 | Young et al. | 371/39.1 |
| 4,722,085 | 1/1988 | Flora et al. | 371/40.1 |
| 4,754,397 | 6/1988 | Varaiya et al. | 364/200 |
| 4,761,785 | 8/1988 | Clark et al. | 371/2.2 |
| 4,768,193 | 8/1988 | Takemae | 371/10.3 |
| 4,775,978 | 10/1988 | Hartness | 371/40.1 |
| 4,817,035 | 3/1989 | Timsit | 371/10.1 |
| 4,849,929 | 3/1989 | Timsit | 371/10.1 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,989,206 | 1/1991 | Dunphy, Jr. et al. | 371/10.1 |
| 4,993,030 | 2/1991 | Krakauer et al. | 371/40.1 |
| 5,088,081 | 2/1992 | Farr | 369/54 |
| 5,130,992 | 7/1992 | Frey, Jr. et al. | 371/40.1 |
| 5,134,619 | 7/1992 | Henson et al. | 371/40.1 |

FOREIGN PATENT DOCUMENTS

0297507 6/1988 European Pat. Off. .
0371243 10/1989 European Pat. Off. .

OTHER PUBLICATIONS

Dishon, et al.; 1987 IEEE; A Highly Available Storage System Using the Checksum Method; pp. 176–181.
IBM Technical Disclosure Bulletin; Use of Non-Volatile Semiconductor Storage for Disk Array Parity; vol. 33 No. 6B Nov. 1990.
Patterson, D. A., Gibson, G., and Katz, H.; A Case For Redundant Arrays of Inexpensive Disks (RAID).
Lee, E. K.; Software and Performance Issues in the Implementation of a RAID Prototype (May 1990).
Chen, P., Gibson, G., Katz, R. H., Patterson, D. A., and Schulze, M.; Introduction to Redundant Arrays of Inexpensive Disks (RAID) (Dec. 1988).
Chen, P., Gibson, G., Katz, R. H., Patterson, D. A., and Schulze, M., et al. Evolution of the Raid 2 Architecture (Jun. 12, 1990).

(List continued on next page.)

Primary Examiner—Charles E. Atkinson
Attorney, Agent, or Firm—Spensley Horn Jubas & Lubitz

[57] ABSTRACT

A method for on-line restoration of redundancy information in a redundant array storage system. The invention provides alternative methods of restoring valid data to a storage unit after a Write failure caused by a temporary storage unit fault. In the first preferred method, a valid redundancy block is generated for the corresponding data blocks on all storage units. Resubmitting the interrupted Write operation causes the old (and potentially corrupted) data block to be "subtracted" out of the re-computed redundancy block. The uncorrupted new data block is written over the old data block, and is "added" into the recomputed redundancy block to create a new, corrected redundancy block. The new, corrected redundancy block is written to the appropriate storage unit. In the second preferred method, a new redundancy block is generated from all valid data blocks and the new data block. The new redundancy block and the new data block are then written to the appropriate storage units. In both cases, the entire method is done on-line, with insignificant interruption of normal operation of the redundant array system, and without requiring added processing during normal operation.

30 Claims, 4 Drawing Sheets

OTHER PUBLICATIONS

Maximum Strategy, Inc., San Jose, Calif.; Strategy 2 Disk Array Controller Operation Manual (Nov. 2, 1988).

Maximum Strategy, Inc., San Jose, Calif.; Strategy 1 Disk Array Controller Operation Manual (Date unknown).

Gibson, G. A., Performance and Reliability in Redundant Arrays of Inexpensive Disks (Date Unknown).

Chen, P., An Evaluation of Redundant Arrays of Disks Using an Amdahl 5890; (May 1989).

Katz, R. H., Gibson, G. A., and Patterson, D. A.; Disk System Architectures for High Performance Computing (Mar. 1989).

Gray, J., Horst, B., and Walker, M.; Parity Striping of Disc Arrays: Low-Cost Reliable Storage with Acceptable Throughput (Jan. 1990).

Schultz, M. E.; Considerations in the Design of a Raid Prototype (Aug. 1988).

Clark, and Corrigan; IBM Systems Journal, vol. 23, No. 3, 1989.

|   | S1 | S2 | S3 | S4 | S5 |
|---|----|----|----|----|----|
| A | ① | 1 | 0 | 1 | 1 |
| B | 1 | ⓪ | 0 | 1 | 0 |
| C | 0 | 1 | ⓪ | 0 | 1 |
| D | 1 | 1 | 1 | ① | 0 |
| E | 0 | 0 | 0 | 1 | ① |
| F | ① | 0 | 1 | 0 | 0 |
| G | 1 | ① | 1 | 1 | 0 |
| H | 0 | 0 | ① | 1 | 0 |

FIG. 2A

|   | S1 | S2 | S3 | S4 | S5 |
|---|----|----|----|----|----|
| A | ① | 1 | 0 | 1 | 1 |
| B | 1 | ⓪ | 0 | 1 | 0 |
| C | X | 1 | ⊗ | 0 | 1 |
| D | 1 | 1 | 1 | ① | 0 |
| E | 0 | 0 | 0 | 1 | ① |
| F | X | 0 | 1 | 0 | 0 |
| G | X | ① | 1 | 1 | 0 |
| H | 0 | 0 | ① | 1 | 0 |

FIG. 2B

ON-LINE RESTORATION OF REDUNDANCY INFORMATION IN A REDUNDANT ARRAY SYSTEM

BACKGROUND OF THE INVENTION

1. Field of the Invention

This invention relates to computer system data storage, and more particularly to methods for on-line restoration of parity information in a redundant array storage system.

2. Description of Related Art

A typical data processing system generally involves one or more storage units which are connected to a Central Processor Unit (CPU) either directly or through a control unit and a channel. The function of the storage units is to store data and programs which the CPU uses in performing particular data processing tasks.

Various types of storage units are used in current data processing systems. A typical system may include one or more large capacity tape units and/or disk drives (magnetic, optical, or semiconductor) connected to the system through respective control units for storing data.

However, a problem exists if one of the large capacity storage units fails such that information contained in that unit is no longer available to the system. Generally, such a failure will shut down the entire computer system.

The prior art has suggested several ways of solving the problem of providing reliable data storage. In systems where records are relatively small, it is possible to use error correcting codes which generate ECC syndrome bits that are appended to each data record within a storage unit. With such codes, it is possible to correct a small amount of data that may be read erroneously. However, such codes are generally not suitable for correcting or recreating long records which are in error, and provide no remedy at all if a complete storage unit fails. Therefore, a need exists for providing data reliability external to individual storage units. Other approaches to such "external" reliability have been described in the art. A research group at the University of California, Berkeley, in a paper entitled "A Case for Redundant Arrays of Inexpensive Disks (RAID)", Patterson, et. al., *Proc. ACM SIGMOD*, June 1988, has catalogued a number of different approaches for providing such reliability when using disk drives as storage units. Arrays of disk drives are characterized in one of five architectures, under the acronym "RAID" (for Redundant Arrays of Inexpensive Disks).

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Computers, Inc.

A RAID 2 architecture stores each bit of each word of data, plus Error Detection and Correction (EDC) bits for each word, on separate disk drives (this is also known as "bit stripping"). For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement also effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for On-Line Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed on to a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 1804 SCSI, that uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi. A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block stripping). A further aspect of the RAID 4 architecture is that a single storage unit is designated as the parity unit.

A limitation of a RAID 4 system is that Writing a data block on any of the independently operating data storage units also requires writing a new parity block on the parity unit. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" sequence.

Thus, a Read and a Write on the single parity unit occurs each time a record is changed on any of the data storage units covered by the parity record on the parity unit. The parity unit becomes a bottle-neck to data writing operations since the number of changes to records which can be made per unit of time is a function of the access rate of the parity unit, as opposed to the faster access rate provided by parallel operation of the multiple data storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage unit containing parity for the remainder of the stripe. Further stripes each have a parity block, the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used).

Thus, no single disk drive is used for storing the parity information, and the bottleneck of the RAID 4 architecture is eliminated. An example of a RAID 5 system is described in U.S. Pat. No. 4,761,785 to Clark et al.

As in a RAID 4 system, a limitation of a RAID 5 system is that a change in a data block requires a Read-Modify-Write sequence comprising two Read and two Write operations: the old parity block and old data block must be read and XOR'd, and the resulting sum must then be XOR'd with the new data. Both the data and the parity blocks then must be rewritten to the disk drives. While the two Read operations may be done in parallel, as can the two Write operations, modification of a block of data in a RAID 4 or a RAID 5 system still takes substantially longer then the same operation on a conventional disk. A conventional disk does not require the preliminary Read operation, and thus does have to wait for the disk drives to rotate back to the previous position in order to perform the Write operation. The rotational latency time alone can amount to about 50% of the time required for a typical data modification operation. Further, two disk storage units are involved for the duration of each data modification operation, limiting the throughput of the system as a whole.

Despite the Write performance penalty, RAID 5 type systems have become increasingly popular, since they provide high data reliability with a low overhead cost for redundancy, good Read performance, and fair Write performance.

A RAID 5 architecture has particular utility in OLTP computer systems. Many OLTP systems must be high-availability systems, meaning that complete failure of the system has a low-probability. High availability can be achieved by using high-reliability components, having a fault-tolerant design with a low mean-time-to-repair (MTTR), and designing for "staged" degradation, where the failure of a component may reduce system capability but without causing total system failure.

Although a principal feature of a RAID system is fault-tolerance, such capability alone does not guarantee a high-availability system. If a storage unit fails, general system operation cannot continue until the failed storage unit is replaced and the information on it is restored. When a storage unit fails in a RAID architecture, the art teaches that a replacement storage unit is substituted for the failed storage unit (either manually or electronically switched in from a set of one or more spares), and the "lost" data is reconstructed on the replacement storage unit by XOR'ing each parity block with all corresponding data blocks from the remaining storage unit drives in the redundancy group. Such reconstruction assumes that the parity information is valid. However, data can be lost in situations not involving a failure of a storage unit. For example, if a temporary "failure"(such as a power loss or controller failure) occurs to a storage unit during a Write operation, there is no assurance that the data or the corresponding parity information were properly written and valid. Since two I/O operations are required to update the data and its associated parity, it is difficult to determine which I/O operation was completed before the system termination. Thus, the data that was being Written could be corrupted. Further, if a storage unit were to totally fail after corruption of some of the parity information stored on other storage units, the failed storage unit could not be fully reconstructed with good data.

One method taught in the art for resolving this problem is set forth in U.S. Pat. No. 4,761,785 to Clark et al. This reference teaches using version numbers stored in each data block and corresponding parity block. When a Write operation for a data block is completed, the version numbers in the data block and its corresponding parity block are equal. During recovery of a lost record, the version numbers are checked to ensure synchronization of the data blocks with the parity block. Forcing recovery without valid synchronization would produce unpredictable data. However, updating version numbers requires a processing overhead throughout normal operation, as well as slightly reduced capacity because of the need to store the version numbers with each block.

Therefore, a need exists for a simple method for ensuring that valid parity information is generated in a RAID system even in the event of a temporary "failure". It is also desirable to have a RAID system in which restoration of such parity information can be conducted "on-line", while general system operation continues in a normal fashion. It is also desirable to have a RAID system in which restoration of such parity information can be conducted without requiring added processing overhead during normal operation.

The present invention provides two such methods.

SUMMARY OF THE INVENTION

The present invention provides two methods of restoring valid data to a storage unit after a Write failure caused by a temporary storage unit fault. Either method is done on-line, with insignificant interruption of normal operation of the redundant array system, and without requiring added processing during normal operation.

The first preferred method includes the following steps:
(1) For the stripe that was being Written when the temporary failure occurred, recomputing the associated redundancy block using all data blocks in the stripe (including the potentially corrupted data block that was being Written before the failure).
(2) Storing the re-computed redundancy block.
(3) Resubmitting the interrupted Write operation from the CPU.
(4) Performing the resubmitted Write operation in normal fashion (i.e., writing over the corrupted data block with the new data block, and updating the recomputed redundancy block).

The first step creates a valid redundancy block for the corresponding data blocks on all storage units. Performing the resubmitted Write operation causes the old (and potentially corrupted) data block to be "subtracted" out of the re-computed redundancy block. The uncorrupted new data block is written over the old data block, and is "added" into the re-computed redundancy block to create a new, corrected redundancy block. The new, corrected redundancy block is written to the appropriate storage unit.

The second preferred method includes the following steps:
(1) Resubmitting the interrupted Write operation to the CPU.
(2) For the stripe that was being Written when the temporary failure occurred, computing a new redundancy block using all valid data blocks in the stripe (excluding the potentially corrupted data block that was being Written before the failure).
(3) Writing over the potentially corrupted old redundancy block with the recomputed redundancy block.
(4) Writing over the potentially corrupted data block with the new data block.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 2A is a diagram of a model RAID 5 system, showing an initial state.

FIG. 2B is a diagram of a model RAID 5 system, showing a failed data block on one storage unit.

Like reference numbers and designations in the drawings refer to like elements.

DETAILED DESCRIPTION OF THE INVENTION

Throughout this description, the preferred embodiment and examples shown should be considered as exemplars, rather than limitations on the method of the present invention.

BACKGROUND INFORMATION

Figure 1:
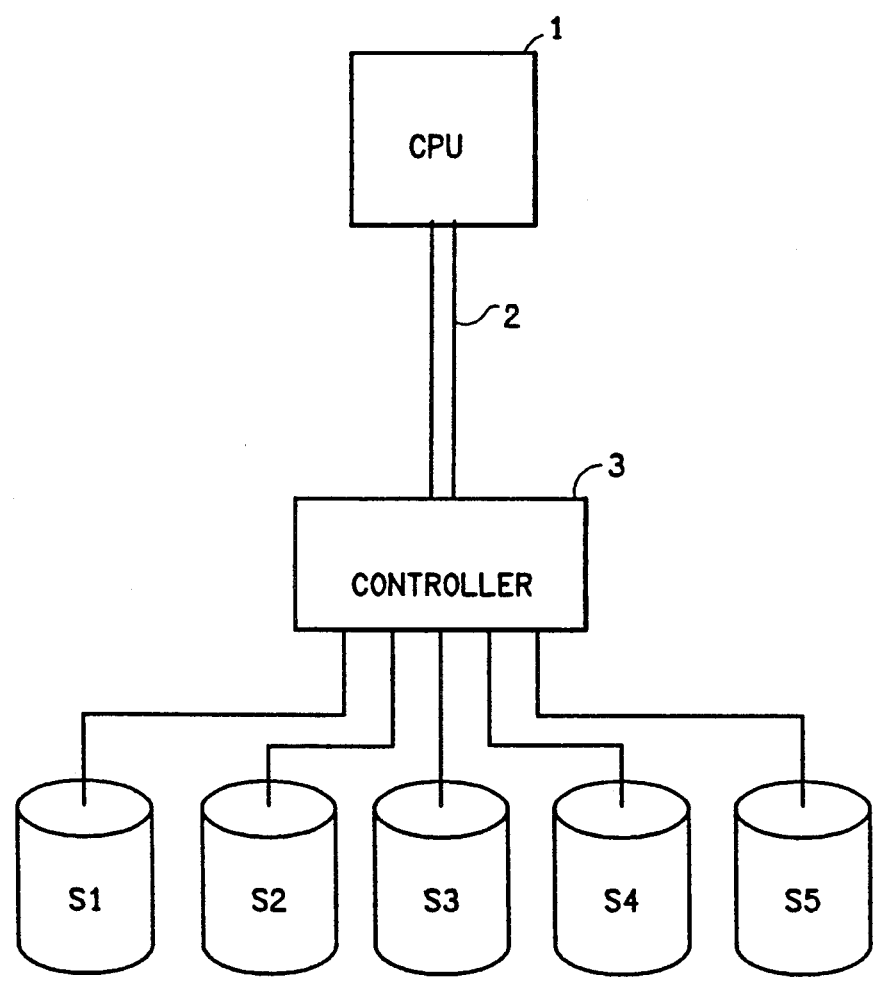
FIG. 1 is block diagram of a generalized RAID system in accordance with the present invention.

FIG. 1 is a block diagram of a generalized RAID system in accordance with the present invention. Shown are a CPU 1 coupled by a bus 2 to an array controller 3. The array controller 3 is coupled to each of the plurality of storage units S1–S5 (five being shown by way of example only) by an I/O bus (e.g., a SCSI bus). The array controller 3 preferably includes a separately programmable, multi-tasking processor (for example, the MIPS R3000 RISC processor, made by MIPS Corporation of Sunnyvale, Calif. which can act independently of the CPU 1 to control the storage units. The present invention is preferably implemented as a multi-tasking computer program executed by the controller 3.

The storage units S1–S5 can be grouped into one or more redundancy groups. In the illustrated examples described below, the redundancy group comprises all of the storage units S1–S5, for simplicity of explanation.

FIG. 2A is a diagram of a model RAID system, showing an initial state. The illustrated array comprises five storage units, S1–S5. Each row A–H is a stripe. Redundancy blocks are indicated by circled numbers, and are spread throughout the array. One bit "blocks" are shown for each storage unit in a stripe for simplicity. Each block could instead be any other unit of size, such as a byte, sector, or group of sectors.

In a modern RAID system, several Write operations can be "stacked", and thus several stripes may be corrupted when such Write operations are interrupted. For simplicity, the following description is directed to restoring a single stripe. However, it should be understood that the invention applies to the more general case of restoring a plurality of stripes after a temporary failure. FIG. 2B shows the same RAID model as FIG. 2A, but with a temporary failure having occurred while Writing to stripe C (the x's representing corrupted data and/or redundancy blocks). Because of the failure, there is no assurance that the data from the CPU 1 or the corresponding redundancy information were properly written and valid. Such a failure can occur, for example, from a power loss to storage unit S1 or to all of the storage units, or from a failure of the controller 3.

After such a temporary failure has been detected and the cause of the failure rectified, either version of the present invention is used to properly restore the failed stripe.

FIRST PREFERRED METHOD

Figure 3:
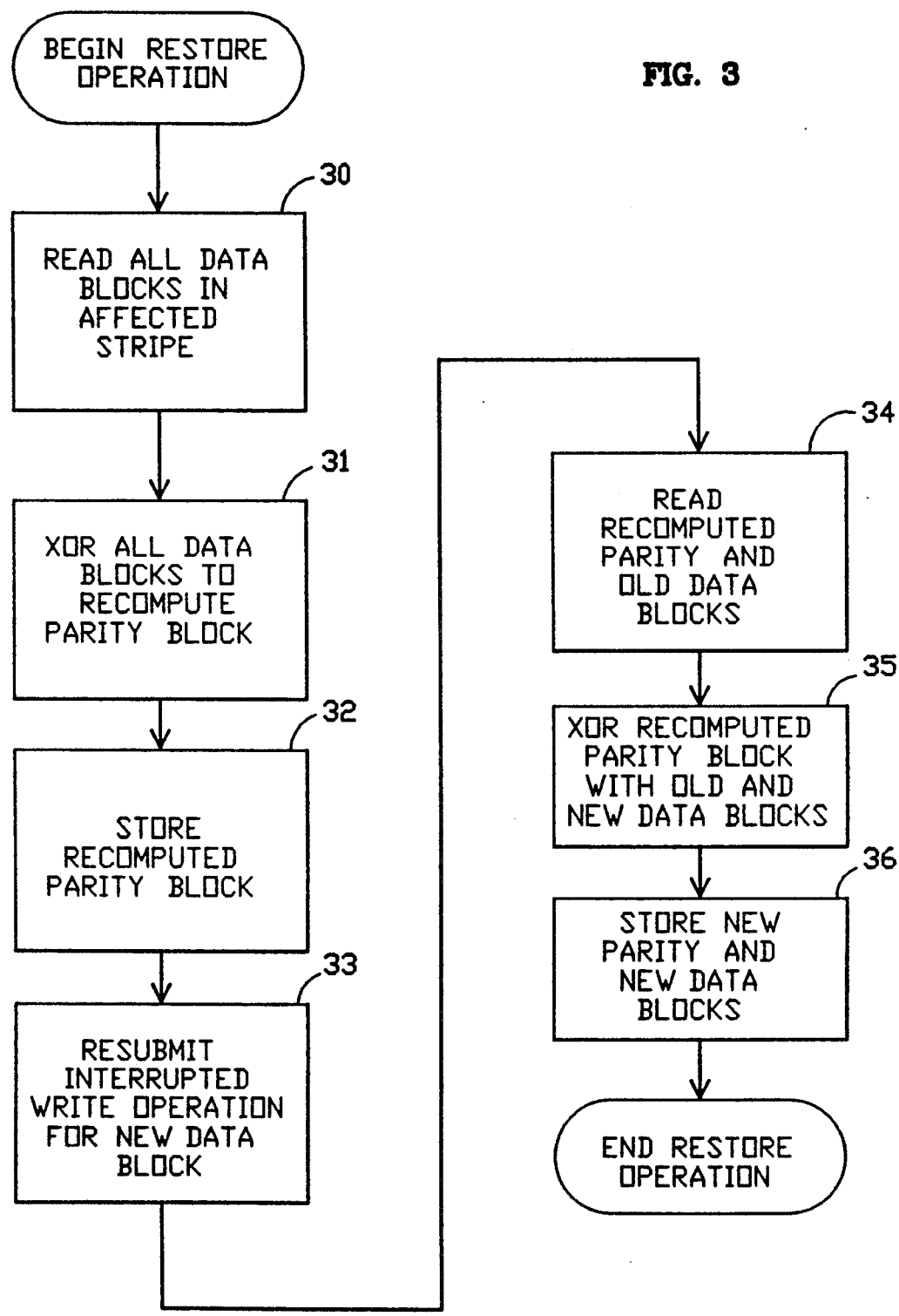
FIG. 3 is a flowchart representing the restoration process for the first preferred embodiment of the present invention.

FIG. 3 is a high-level flowchart representing the steps of the restoration process for a first preferred embodiment of the invention. The steps shown in FIG. 3 are referenced below.

For each stripe that was being Written when the temporary failure occurred (stripe C in FIG. 2A), the associated redundancy block (on S3 in FIG. 2B) is re-computed using all data blocks in the stripe (including the potentially corrupted data block that was being Written before the failure).

To re-compute the redundancy block in the preferred embodiment, the data blocks are Read from storage units S1, S2, S4, and S5 for stripe C in the array (Step 30) and XOR'd (Step 31). This first step creates a redundancy block that is valid for the actual values of the corresponding data blocks on all storage units, regardless of whether the data block on S1 is a "0" or a "1". The re-computed redundancy block may be stored in the corresponding location (S3 on stripe C) of the array, or saved in a "scratchpad" memory area for faster processing (Step 32).

Thereafter, the valid data block from the interrupted Write operation that was being executed by the CPU 1 is resubmitted to the array controller 3 for storage on S1 on stripe C (in this example) (Step 33). The Write operation is performed in normal fashion. That is, the re-computed redundancy block (from S3 on stripe C, or in scratchpad memory) and old "data" block (from S1 on stripe C) are Read from the array (Step 34), and the re-computed redundancy block is modified by "subtracting out" (XOR'ing in the preferred embodiment) the old "data" block and "adding in" (XOR'ing) the new data block (Step 35). The new redundancy block and the new data block are then stored on the appropriate storage units of the array (Step 36).

Performing the resubmitted Write operation causes the old (and potentially corrupted) data block to be "subtracted" out of the re-computed redundancy block. The uncorrupted new data block is written over the old data block, and is "added" into the re-computed redundancy block to create a new, corrected redundancy block. The new, corrected redundancy block is written to the appropriate storage unit. After each affected stripe is corrected, the array may then be used in normal fashion.

As is known in the art, the storage units involved in any restoration operation are preferably "locked" so that any concurrently operation I/O tasks cannot affect the restoration process.

SECOND PREFERRED METHOD

Figure 4:
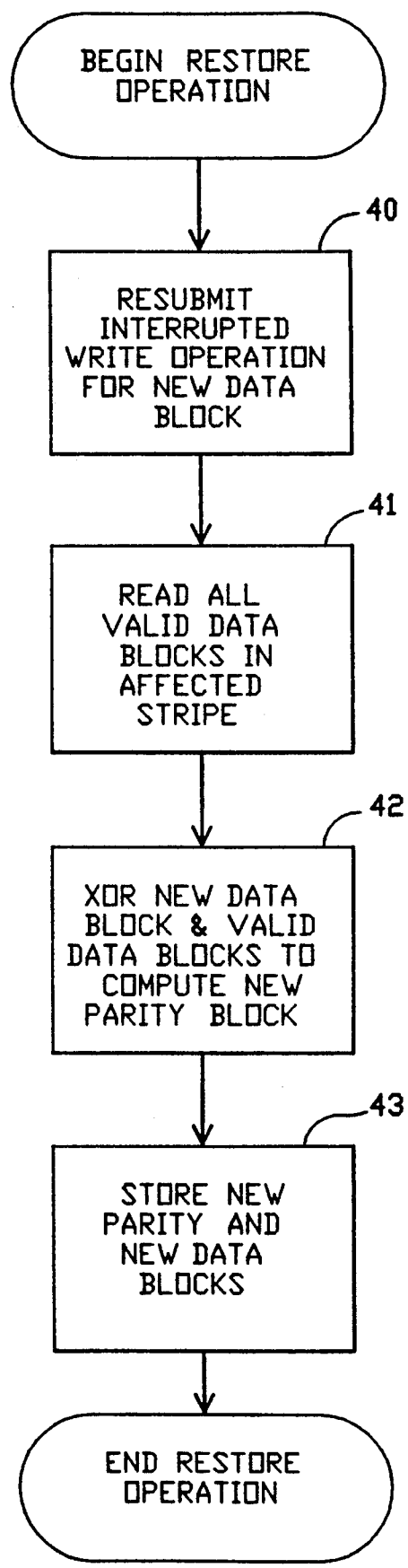
FIG. 4 is a flowchart representing the restoration process for the second preferred embodiment of the present invention.

FIG. 4 is a flowchart representing the restoration process for a second preferred embodiment of the present invention. The steps shown in FIG. 4 are referenced below.

For each affected stripe, the valid data block from the interrupted Write operation that was being executed by the CPU 1 is resubmitted to the array controller 3 for storage (Step 40). For the stripe that was being Written when the temporary failure occurred (stripe C in FIG. 2A), a new redundancy block is computed using all valid data blocks in the stripe (excluding the potentially corrupted data block that was being Written before the failure, as well as the redundancy block for the stripe).

To compute the new redundancy block, the data blocks are Read from storage units S2, S4, and S5 for stripe C in the array (Step 30) and XOR'd (in the preferred embodiment) with the new data block (Step 41). This first step creates a redundancy block that is valid for the actual values of the corresponding valid data blocks on all storage units and for the new data block.

Thereafter, the new redundancy block is stored in the corresponding redundancy block location (S3 on stripe C) of the array, and the new data block is stored on the appropriate storage unit of the array (S1 on stripe C) (Step 43). After each affected stripe is corrected, the array may then be used in normal fashion.

Again, the storage units involved in any restoration operation are preferably "locked" so that any concurrently operation I/O tasks cannot affect the restoration process.

ADDITIONAL EMBODIMENTS

Under both methods described above, the possibility exists that the CPU 1 cannot resubmit one or more Write requests that were outstanding at the time the array failed (e.g., because of some failure in the CPU 1). It is still necessary to assure that the redundancy data on the storage units is consistent with the valid user data in the data blocks of each stripe that were not being modified during the failure. Otherwise, a subsequent error cannot be corrected. Therefore, the redundancy block of each stripe affected by the failure is restored by reading each data block (including the corrupted data block) in the stripe, generating a new redundancy block from such data blocks, and storing the new redundancy block in its proper place in the stripe (i.e., essentially performing Steps 30, 31, and 32 described above). Preferably, such restoration is done on-line as a separate task while the array continues to function normally at least with respect to stripes that were not affected by the failure.

Although the above-described procedure assures that the redundancy block in each stripe affected by a temporary failure is restored, so that subsequent modifications to data blocks in the stripe are valid, it would be desirable to fully restore the data that was being written during the failure. Therefore, to provide greater reliability, the controller 3 for the RAID system of the present invention preferably includes a non-volatile storage device (e.g., battery powdered RAM) as a data buffer for temporarily storing Write requests from the CPU 1 until each Write operation has completed. If a temporary failure occurs as described above, the controller 3 can first attempt to obtain the Write data from the non-volatile storage device. If that action fails for any reason, the controller 3 can attempt to obtain the Write data from the CPU 1.

SUMMARY

The invention thus provides two simple methods for ensuring that valid redundancy information is generated in a RAID system even in the event of a temporary "failure". Because of the locking of each affected storage unit during a restoration operation and implementation as a concurrent task, either method can be used on-line with insignificant interruption of normal operation of the redundant array system, and without requiring added processing during normal operation.

A number of embodiments of the present invention have been described. Nevertheless, it will be understood that various modifications may be made without departing from the spirit and scope of the invention. For example, the present invention can be used with RAID 3, RAID 4, or RAID 5 systems. Furthermore, an error-correction method in addition to or in lieu of the XOR-generated parity may be used for the necessary redundancy information. One such method using Reed-Solomon codes is disclosed in U.S. Pat. No. 5,148,432, issued Sep. 15, 1992, entitled "Arrayed Disk Drive System and Method", and assigned to the assignee of the present invention. With the structure and method taught by that reference, the present invention can accommodate the loss of two storage units if both XOR and Reed-Solomon (or any other system) redundancy is used. Accordingly, it is to be understood that the invention is not to be limited by the specific illustrated embodiment, but only by the scope of the appended claims.

We claim:

1. In a redundant array of data storage units coupled to a controller, the data storage units having at least one stripe containing a plurality of data blocks and at least one associated redundancy block, a method for restoration of a valid data block and at least one associated redundancy block to each data storage unit stripe after a potential corruption in either of such blocks caused by a temporary fault in a data storage unit during a data modification operation, comprising the steps of:
   a. accessing all of the data blocks, including the potentially corrupted data block, in each stripe containing the potentially corrupted blocks;
   b. computing at least one redundancy block from the accessed blocks;
   c. saving the at least one computed redundancy block;
   d. resubmitting the valid data block from the data modification operation to the redundant array of storage units for storage;
   e. updating the at least one saved computed redundancy block;
   f. storing the updated at least one redundancy block and the valid data block in the stripe.

2. The method of claim 1, wherein at least one redundancy block in each stripe contains parity information, and the step of computing the parity redundancy block comprises exclusively-OR'ing the accessed blocks.

3. The method of claim 1, wherein at least one saved computed redundancy block contains parity information, and the step of updating that parity redundancy block comprises the steps of:
   a. accessing the potentially corrupted data block; and
   b. exclusively-OR'ing the accessed data block with the saved parity redundancy block and the resubmitted valid data block to generate a new parity redundancy block.

4. The method of claim 1, further including the step of performing the steps of claim 1 as a task concurrently with other input/output tasks.

5. The method of claim 4, further including the step of locking each block being read or modified during restoration.

6. The method of claim 1, further including the step of storing each data modification operation submitted to the redundant array in a non-volatile storage device until the data modification operation is completed.

7. In a redundant array of data storage units coupled to a controller, the data storage units having at least one stripe containing a plurality of data blocks and at least one associated redundancy block, a method for on-line restoration of a valid data block and at least one associated redundancy block to each data storage unit stripe after a potential corruption in either of such blocks caused by a temporary fault in a data storage unit during a data modification operation, comprising the steps of:
   a. resubmitting the valid data block from the data modification operation to the redundant array of storage units for storage;
   b. accessing all of the uncorrupted data blocks in the stripe containing the potentially corrupted blocks;
   c. computing at least one redundancy block from the accessed blocks and the resubmitted valid data block;
   d. storing the computed at least one redundancy block and the valid data block in the stripe;
   e. performing restoration as a task concurrently with other input/output tasks.

8. The method of claim 7, wherein at least one redundancy block in each stripe contains parity information, and the step of computing the parity redundancy block comprises exclusively-OR'ing the accessed blocks with the resubmitted valid data block.

9. The method of claim 7, further including the step of locking each block being read or modified during restoration.

10. The method of claim 7, further including the step of storing each data modification operation submitted to the redundant array in a non-volatile storage device until the data modification operation is completed.

11. In a redundant array of data storage units coupled to a controller, the data storage units having at least one stripe containing a plurality of data blocks and at least one associated redundancy block, a method for restoration of at least one valid redundancy block to each data storage unit strip after a potential corruption in a data block and/or in such redundancy block in such stripe caused by a temporary fault in a data storage unit during a data modification operation, comprising the steps of:
   a. accessing all of the data blocks, including the potentially corrupted data block, in each stripe containing the potentially corrupted blocks;
   b. computing at least one redundancy block from the accessed blocks;
   c. saving the at least one computed redundancy block in the stripe.

12. The method of claim 11, wherein at least one redundancy block in each stripe contains parity information, and the step of computing the parity redundancy block comprises exclusively-OR'ing the accessed blocks.

13. The method of claim 11, further including the step of performing the steps of claim 12 as a task concurrently with other input/output tasks.

14. The method of claim 13, further including the step of locking each block being read or modified during restoration.

15. The method of claim 11, further including the step of storing each data modification operation submitted to the redundant array in a non-volatile storage device until the data modification operation is completed.

16. A control system for use in conjunction with a redundant array of data storage units, the data storage units having at least one stripe containing a plurality of data blocks and at least one associated redundancy block, the control system for restoration of a valid data block and at least one associated redundancy block to each data storage unit stripe after a potential corruption in either of such blocks caused by a temporary fault in a data storage unit during a data modification operation, the control system including:
   a. coupling means for coupling the control system to the array of storage units;
   b. restoration means, coupled to the coupling means, for:
      (1) accessing all of the data blocks, including the potentially corrupted data block, in each stripe containing the potentially corrupted blocks;
      (2) computing at least one redundancy block from the accessed blocks;
      (3) saving the at least one computed redundancy block;
      (4) resubmitting the valid data block from the data modification operation to the redundant array of storage units for storage;
      (5) updating the at least one saved computed redundancy block;
      (6) storing the updated at least one redundancy block and the valid data block in the stripe.

17. The control system of claim 16, wherein at least one redundancy block in each stripe contains partity information, and the parity redundancy block is computed by exclusively-OR'ing the accessed blocks.

18. The control system of claim 16, wherein at least one saved computed redundancy block contains parity information, and the control system further includes means for updating that parity redundancy block by:
   a. accessing the potentially corrupted data block; and
   b. exclusively-OR'ing the accessed data block with the saved parity redundancy block and the resubmitted valid data block to generate a new parity redundancy block.

19. The control system of claim 16, wherein the control system includes means for performing restoration as a task concurrently with other input/output tasks.

20. The control system of claim 19, wherein the control system further includes means for locking each block being read or modified during restoration.

21. The control system of claim 16, further including a non-volatile storage device, coupled to the control system, for storing each data modification operation submitted to the redundant array until the data modification operation is completed.

22. A control system for use in conjunction with a redundant array of data storage units, the data storage units having at least one stripe containing a plurality of data blocks and at least one associated redundancy block, the control system for on-line restoration of a valid data block and at least one associated redundancy block to each data storage unit stripe after a potential corruption in either of such blocks caused by a temporary fault in a data storage unit during a data modification operation, the control system including:
   a. coupling means for coupling the control system to the array of storage units;
   b. restoration means, coupled to the coupling means, for:
      (1) resubmitting the valid data block from the data modification operation to the redundant array of storage units for storage;
      (2) accessing all of the uncorrupted data blocks in the stripe containing the potentially corrupted blocks;
      (3) computing at least one redundancy block from the accessed blocks and the resubmitted valid data block;
      (4) storing the computed at least one redundancy block and the valid data block in the stripe;
      (5) performing restoration as a task concurrently with other input/output tasks.

23. The control means of claim 22, wherein at least one redundancy block in each stripe contains parity information, and the parity redundancy block is computed by exclusively-OR'ing the accessed blocks with the resubmitted valid data block.

24. The control system of claim 22, wherein the control system further includes means for locking each block being read or modified during restoration.

25. The control system of claim 22, further including a non-volatile storage device, coupled to the control system, for storing each data modification operation submitted to the redundant array until the data modification operation is completed.

26. A control system for use in conjunction with a redundant array of data storage units, the data storage units having at least one stripe containing a plurality of data blocks and at least one associated redundancy block, the control system for restoration of at least one valid redundancy block to each data storage unit stripe after a potential corruption in a data block and/or in such redundancy block in such stripe caused by a temporary fault in a data storage unit during a data modification operation, the control system including:
   a. coupling means for coupling the control system to the array of storage units;
   b. restoration means, coupled to the coupling means, for:
      (1) accessing all of the data blocks, including the potentially corrupted data block, in each stripe containing the potentially corrupted blocks;
      (2) computing at least one redundancy block from the accessed blocks;
      (3) saving the at least one computed redundancy block in the stripe.

27. The control system of claim 26, wherein at least one redundancy block in each stripe contains parity information, and the parity redundancy block is computed by exclusively OR'ing the accessed blocks.

28. The control system of claim 26, wherein the control system includes means for performing restoration as a task concurrently with other input/output tasks.

29. The control system of claim 28, wherein the control system further includes means for locking each block being read or modified during restoration.

30. The control system of claim 30, further including a non-volatile storage device, coupled to the control system, for storing each data modification operation submitted to the redundant array until the data modification operation is completed.

* * * * *